US010336485B2

(12) United States Patent
Takemura et al.

(10) Patent No.: US 10,336,485 B2
(45) Date of Patent: Jul. 2, 2019

(54) BINDING MACHINE FOR GARDENING

(71) Applicant: MAX CO., LTD., Tokyo (JP)

(72) Inventors: Hajime Takemura, Tokyo (JP); Hiroyuki Ohkawa, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 15/622,163

(22) Filed: Jun. 14, 2017

(65) Prior Publication Data

US 2017/0361957 A1 Dec. 21, 2017

(30) Foreign Application Priority Data

Jun. 15, 2016 (JP) .................................. 2016-119413

(51) Int. Cl.
| | |
|---|---|
| *B65H 35/04* | (2006.01) |
| *B65H 37/04* | (2006.01) |
| *B65B 13/16* | (2006.01) |
| *B65B 13/34* | (2006.01) |
| *B65B 13/02* | (2006.01) |
| *A01G 17/08* | (2006.01) |

(52) U.S. Cl.
CPC ............... *B65B 13/16* (2013.01); *A01G 17/08* (2013.01); *A01G 17/085* (2013.01); *B65B 13/025* (2013.01); *B65B 13/345* (2013.01); *B65H 35/04* (2013.01); *B65H 37/04* (2013.01)

(58) Field of Classification Search
CPC ............ B65H 35/0066; B65H 35/0026; B65H 35/0033; B65B 13/16; B65B 13/345; B65B 13/025; A01G 17/08; A01G 17/085
See application file for complete search history.

(56) References Cited

U.S. PATENT DOCUMENTS 3,625,799 A * 12/1971 Way .................... B65B 51/06
156/518
3,725,182 A * 4/1973 Regan ................. B65H 35/0026
156/517

(Continued)

FOREIGN PATENT DOCUMENTS

| CN | U-204047416 | 12/2014 |
|---|---|---|
| CN | U-204047417 | 12/2014 |

(Continued)

OTHER PUBLICATIONS

Extended European Search Report dated Oct. 5, 2017 in corresponding European patent application 17176039.0 (8 pages).

(Continued)

*Primary Examiner* — Alex B Efta
(74) *Attorney, Agent, or Firm* — Drinker Biddle & Reath LLP (57) ABSTRACT

A binding machine for gardening includes a binding machine main body, a magazine attached to the binding machine main body and loaded with a tape, and a clincher arm rotatably attached to the binding machine main body and configured to draw the tape out of the magazine and bind an object to be bound which is wound by the tape. The magazine includes a housing in which the tape is loaded, a boss provided at a center of the housing and configured to support a reel around which the tape is wound, and an abutting member rotatably attached to the boss and abuts against an inner peripheral surface of the reel.

4 Claims, 11 Drawing Sheets

(56) References Cited

U.S. PATENT DOCUMENTS

| | | | | |
|---|---|---|---|---|
| 6,896,025 B2 * | 5/2005 | Urushizaki | ........ | B65H 35/0033 |
| | | | | 156/523 |
| 6,968,988 B2 * | 11/2005 | Hayashi | ............... | A01G 17/085 |
| | | | | 227/108 |
| 2015/0266692 A1 * | 9/2015 | Tiedemann | ........ | B65H 35/0026 |
| | | | | 156/577 |

FOREIGN PATENT DOCUMENTS

| | | | | |
|---|---|---|---|---|
| GB | 642394 A | * | 8/1950 | ......... B65H 35/0033 |
| JP | 2005-224197 A | | 8/2005 | |
| KR | A-2013-0078292 | | 7/2013 | |
| TW | A-200727774 | | 8/2007 | |
| TW | A-200727775 | | 8/2007 | |

OTHER PUBLICATIONS

TW Office Action dated Feb. 18, 2019 from corresponding Taiwanese patent application No. 106119968.

* cited by examiner

BINDING MACHINE FOR GARDENING

CROSS-REFERENCE TO RELATED APPLICATION

This application claims priority from Japanese Patent Application No. 2016-119413 filed on Jun. 15, 2016, the entire contents of which are incorporated herein by reference.

TECHNICAL FIELD

The present invention relates to a binding machine for gardening.

BACKGROUND

Traditionally, binding machines for gardening are widely used when binding branches and vines of fruit trees, vegetables and the like into support pillars, or binding vegetables and bags, and the like. In the binding machine for gardening, a binding process is performed by a series of processes. That is, the tape is pulled out from the binding machine main body by the opening and closing operation of a clincher arm and the tape is stretched between the front end portions of the clincher arm and the binding machine main body, and in this state, the binding machine main body is pushed out forward to wind the tape around an object to be bound, and then, the clincher arm is closed again to bind the tape with a staple and to cut the tape with the cutting blade.

By the way, when performing the binding work using the above-described binding machine for gardening, the tape roll in the tape magazine reversely rotates due to the posture change or vibration of the binding machine for gardening, and the front end portion of the tape may be returned. In such a case, when the driver handle and the clincher arm are closed, the tape gripping device on the side of the clincher arm cannot grip the front end portion of the tape on the driver handle side so that the work is interrupted to reset the tape again. As a result, it has been a cause of degrading the work efficiency.

In order to cope with this problem, a binding machine for gardening which holds a tape reel by an elastic member provided on a boss has been proposed. For example, Japanese Unexamined Patent Application Publication (JP-A) No. 2005-224197 discloses a binding machine for gardening in which a C-shaped backlash preventing spring is attached to a tape hub support boss in a tape magazine of a binding machine for gardening, a U-shaped projecting portion formed near the free end of the backlash preventing spring is made to project outward, and the inner peripheral surface of a tape roll mounted on the tape hub support boss is pushed to the outside by the U-shaped projecting portion to prevent a reverse rotation of the tape roll.

SUMMARY

However, the binding machine for gardening disclosed in JP-A-2005-224197 has the following problems. In the binding machine for gardening according to the related art, when a tape roll wound on a tape reel having a large inner diameter is used, since a U-shaped projecting portion is not in contact with the inner diameter of the tape reel, the tape reel may not be braked, and a tape will be returned. In contrast, when a stroke of the U-shaped projecting portion is made large, there is a problem that a tape roll wound on a tape reel having a small diameter used from the past cannot be used.

Therefore, the invention has been made in view of the problem, and is to provide a binding machine for gardening that can reliably prevent return of a tape even when the tape wound on tape reels having different inner diameter dimensions is used.

The invention has been made to solve the problems, and is characterized by the following.

(1) A binding machine for gardening comprising:
a binding machine main body;
a magazine attached to the binding machine main body and loaded with a tape; and
a clincher arm rotatably attached to the binding machine main body and configured to draw the tape out of the magazine and bind an object to be bound which is wound by the tape, wherein
the magazine includes
a housing in which the tape is loaded,
a boss provided at a center of the housing and configured to support a reel around which the tape is wound, and
an abutting member rotatably attached to the boss and abuts against an inner peripheral surface of the reel.

(2) The binding machine for gardening according to (1), wherein
a front end portion of the abutting member is disposed on a downstream side in a feeding direction of the tape with respect to a base end portion of the abutting member.

(3) The binding machine for gardening according to (1) or (2), wherein
the abutting member has an inclined surface inclined from a top surface portion toward an end portion opposite to the top surface portion in the feeding direction of the tape.

(4) The binding machine for gardening according to any one of (1) to (3), wherein
the abutting member is urged in a direction opposite to the feeding direction of the tape.

According to the invention, the abutting member is configured to be rotatable and abut against the inner peripheral surface of the reel, and thus it is possible to reliably prevent return of the tape even in various reels having different inner diameter dimensions.

DETAILED DESCRIPTION

Preferred embodiments of the present invention will be described in detail with reference to the accompanying drawings.

Configuration Example of Binding Machine for Gardening 100

Figure 1:
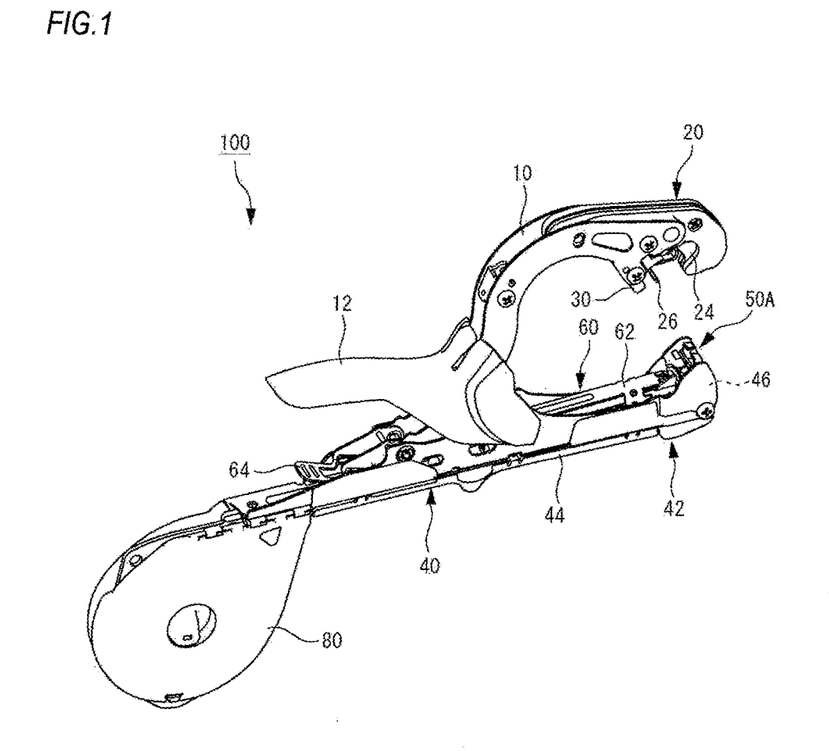
FIG. 1 is a perspective view illustrating an example of a configuration of a binding machine for gardening according to an embodiment of the invention.
Figure 2:
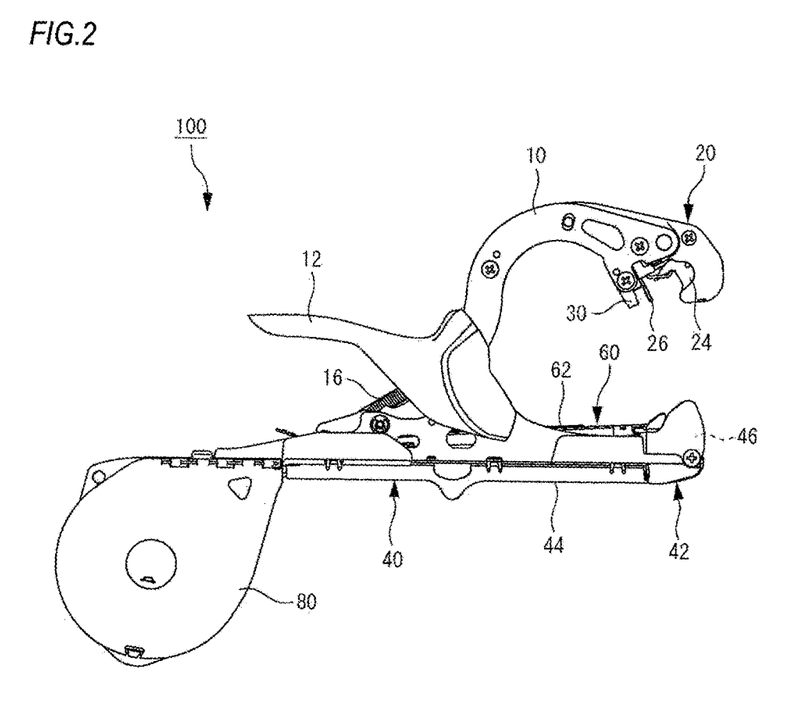
FIG. 2 is a front view illustrating an example of the configuration of the binding machine for gardening.
Figure 3:
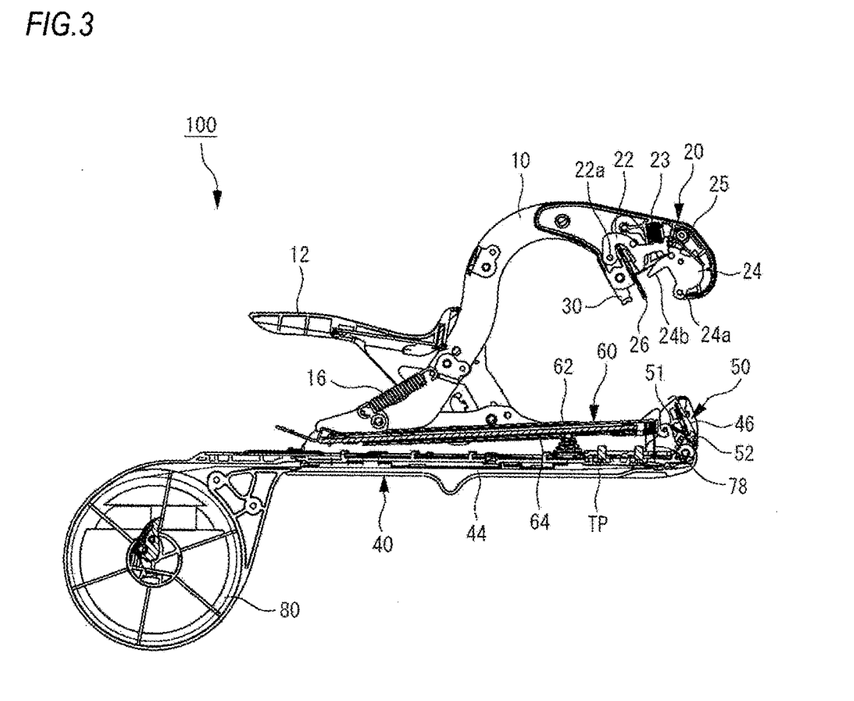
FIG. 3 is a cross-sectional view illustrating an example of the configuration of the binding machine for gardening.

FIG. 1 is a perspective view illustrating an example of a configuration of a binding machine for gardening 100 according to a first embodiment, FIG. 2 is a front view thereof, and FIG. 3 is a cross-sectional view thereof. In FIGS. 1 to 3, the right side of the sheet is set as a front side of the binding machine for gardening 100, and the left side of the sheet is set as a rear side of the binding machine for gardening 100.

As illustrated in FIGS. 1 to 3, the binding machine for gardening 100 as a hand-held tool includes a clincher arm 10, a binding machine main body 40, a handle 12, a tape drawing portion 20, a tape transport portion 42, a tape cutting portion 50, a staple magazine 60, and a tape magazine 80.

The rear end portion of the clincher arm 10 is rotatably attached to the binding machine main body 40 and is urged rearward by a tension spring 16. The handle 12 is a part to be grasped by the user, and a substantially middle portion thereof is rotatably attached to the clincher arm 10, and its front end portion is rotatably attached to the binding machine main body 40. With such a configuration, as the handle 12 is opened and closed, the clincher arm 10 opens and closes in accordance with the binding machine main body 40 by the lever principle of the handle 12.

The tape drawing portion 20 is a mechanism for drawing out the tape TP from the binding machine main body 40, and is provided at the front end portion of the clincher arm 10. The tape drawing portion 20 has a lock plate 22, a tape catch 24, and a tape plate 26.

The lock plate 22 is configured to be rotatable about a shaft 22a as a fulcrum provided at one end side, and the other end side thereof is urged toward the tape catch 24 side by a coil spring 23. The lock plate 22 locks the tape catch 24 by being engaged with the tape catch 24 by the urging force of the coil spring 23 and fixes the tape catch 24 at a position separated from the tape plate 26.

The tape catch 24 is provided to be rotatable about the shaft 24a as a fulcrum and is urged toward the tape plate 26 side by a torsion coil spring 25. When the lock of the lock plate 22 is released at the time of drawing out the tape, the leading end portion 24b having a tapered shape moves toward the tape plate 26 by the urging force of the torsion coil spring 25.

The tape plate 26 is disposed to face the tape catch 24, and its front end portion extends from the lock plate 22 to the binding machine main body 40. The tape TP is sandwiched between the extending portion of the tape plate 26 and the tape catch 24, and the tape TP is pulled upward from a tape guide 46 in accordance with the return (opening) operation of the clincher arm 10.

The tape transport portion 42 has a tape holder 44 and the tape guide 46. The tape holder 44 is a path for transporting the tape from the tape magazine 80 to the tape guide 46, and is laid along the longitudinal direction of the binding machine main body 40. Further, the tape holder 44 is configured to be openable and closable with one side in the longitudinal direction as a fulcrum, so that the setting operation of the tape TP can be easily performed. The tape guide 46 is rotatably provided at the front end portion of the binding machine main body 40 (tape holder 44), and holds the leading end portion of the tape in a state of being pulled upward from the tape guide 46.

The tape cutting portion 50 has a cutting blade 51 for cutting the tape TP, and a lock mechanism 52 for locking and unlocking the cutting blade 51. The cutting blade 51 is fixed to a predetermined position of the tape guide 46 by the lock mechanism 52 and can be pulled out from the tape guide 46 by releasing the lock mechanism 52.

The staple magazine 60 is attached to the upper surface side of the binding machine main body 40, and includes a staple magazine main body 62 and a pusher unit 64. The staples adhesively connected therebetween are loaded on the staple magazine 60. The pusher unit 64 is slidably attached to the upper surface portion of the staple magazine 60 to open and close the upper surface portion, and pushes the staple in the staple magazine 60 to the ejection port.

The tape magazine 80 is attached to the rear end portion of the binding machine main body 40 and houses the tape roll around which the tape TP is wound. The tape magazine 80 rotates in the forward direction by the drawing operation of the tape TP based on the opening and closing operation of the clincher arm 10, and feeds the tape TP to the tape transport portion 42. The configuration and function of the tape magazine 80 will be described later.

Operation Example of Binding Machine for Gardening 100

Figure 4:
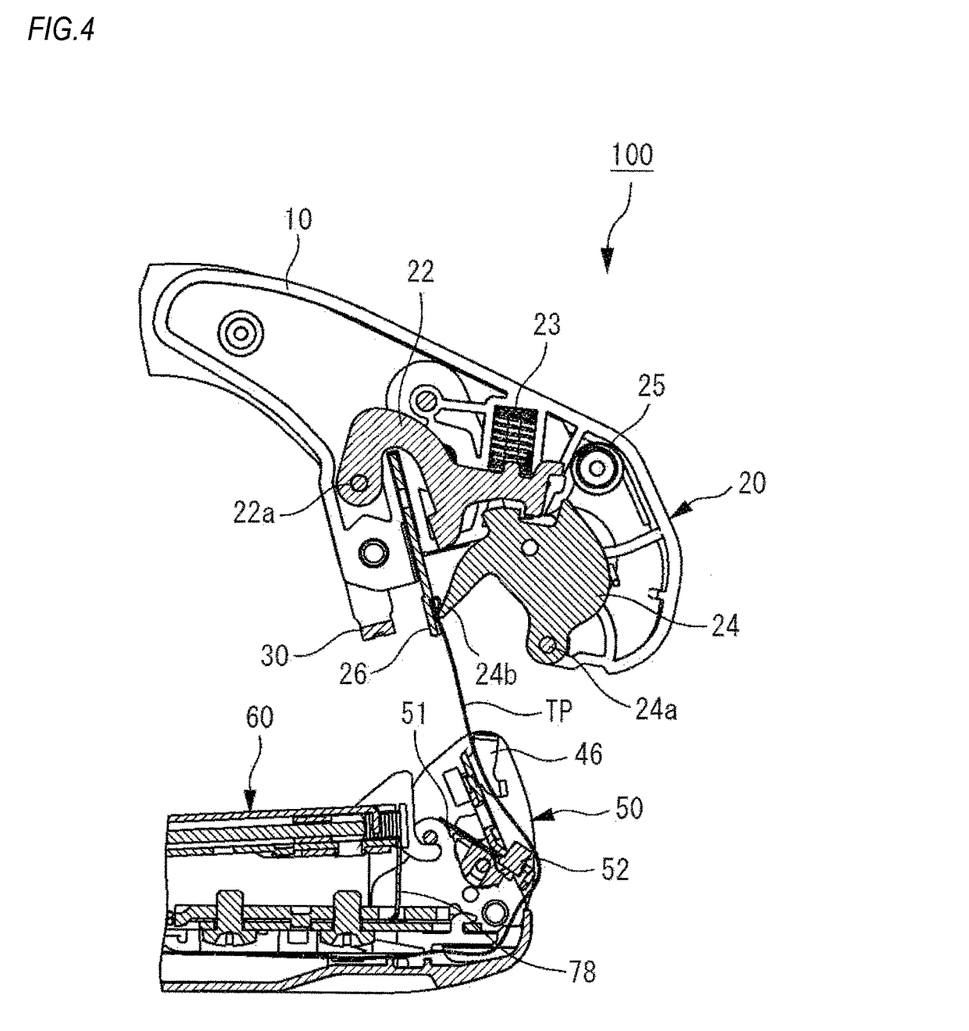
FIG. 4 is a cross-sectional view illustrating a state at the time of pulling out a tape in the binding machine for gardening.
Figure 5:
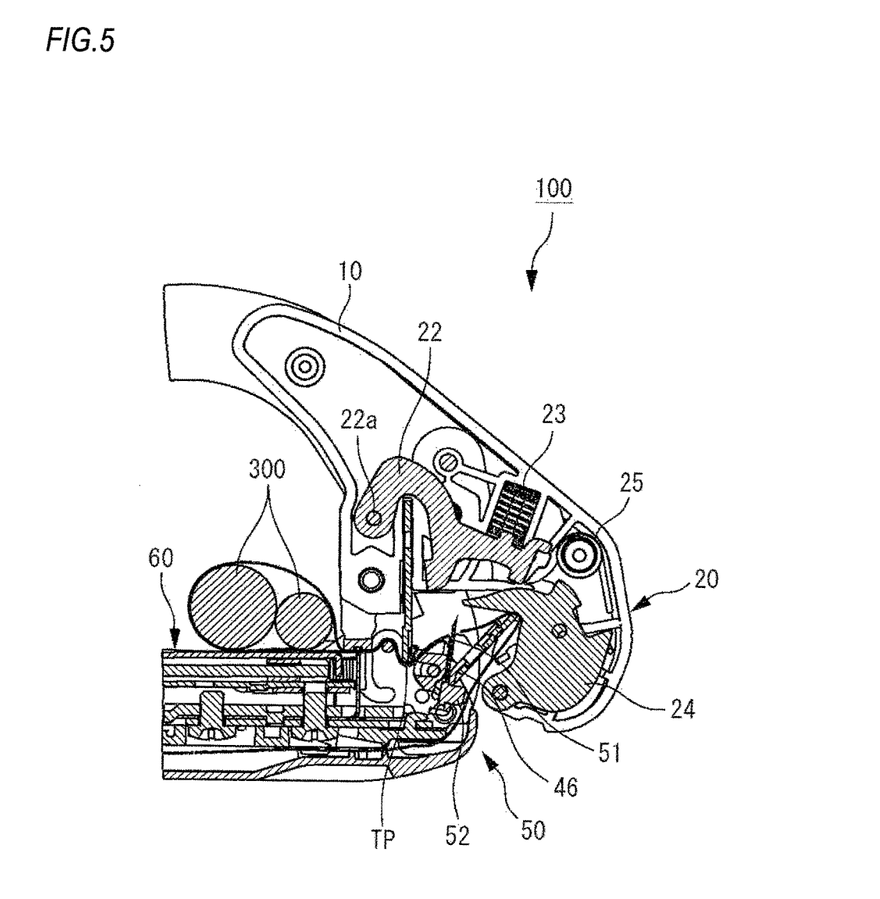
FIG. 5 is a cross-sectional view illustrating a state at the time of cutting a tape in the binding machine for gardening.

Next, an example of the operation at the time of binding processing of the binding machine for gardening 100 will be described. FIG. 4 is a cross-sectional view illustrating a state at the time of pulling out the tape TP in the binding machine for gardening 100. FIG. 5 is a cross-sectional view illustrating a state at the time of cutting the tape TP in the binding machine for gardening 100.

Referring to FIGS. 1 to 5, when the handle 12 is gripped by the user, the clincher arm 10 moves (descends) in a direction of approaching the binding machine main body 40. As a result, the lock plate 22 abuts against the tape guide 46 on the side of the binding machine main body 40 and the lock plate 22 is pushed upward, and thus, the lock of the tape catch 24 by the lock plate 22 is released.

When the tape catch 24 is unlocked, the tape catch 24 rotates toward the tape plate 26 and the tape TP is pressed against the tape guide 46 by the leading end portion 24b of the tape catch 24.

Subsequently, when the user releases the grip of the handle 12, the clincher arm 10 moves (ascends) in a direction away from the binding machine main body 40. Accordingly, as illustrated in FIG. 4, the tape catch 24 is transferred from the tape guide 46 to the tape plate 26, and the tape TP is pulled upward from the tape guide 46 in a state of being sandwiched between the tape plate 26 and the tape catch 24. In addition, as the clincher arm 10 ascends, the lock plate 22 and the tape catch 24 are engaged with each other.

Subsequently, the tape TP is pressed against a branch or a support pillar of vegetables and the like (hereinafter, the branch and the support are collectively referred to as a bound article 300) by pushing out to the front of the binding machine main body 40, and the bound article 300 is taken into the clincher arm 10.

Subsequently, when the user strongly grasps the handle 12 again, the clincher arm 10 moves (descends) in a direction of approaching the binding machine main body 40, and the tape TP is wrapped around the bound article 300.

As the clincher arm 10 descends, the tape guide 46 moves along the opposing inclined surface of the tape catch 24, and when reaching the position where the movement is restricted, the tape catch 24 rotates in a direction away from the tape plate 26 (front side). Accordingly, the tape guide 46 also rotates to the front side.

With the rotation of the tape guide 46, as illustrated in FIG. 5, the cutting blade 51 also rotates, and a blade provided on the leading end side of the cutting blade 51 is thrust into the tape TP, so that the tape TP is cut. Further, as the clincher 30 presses the staple magazine main body 62, and the staple magazine main body 62 tilts about the rear end as a fulcrum, the driver 78 ejects the staple from the ejection port, and the overlapping portion of the tape TP is bound by the staple. In the present embodiment, the binding operation of the bound article 300 is performed by such a series of processes.

Configuration Example of Tape Magazine 80

Figure 6A:
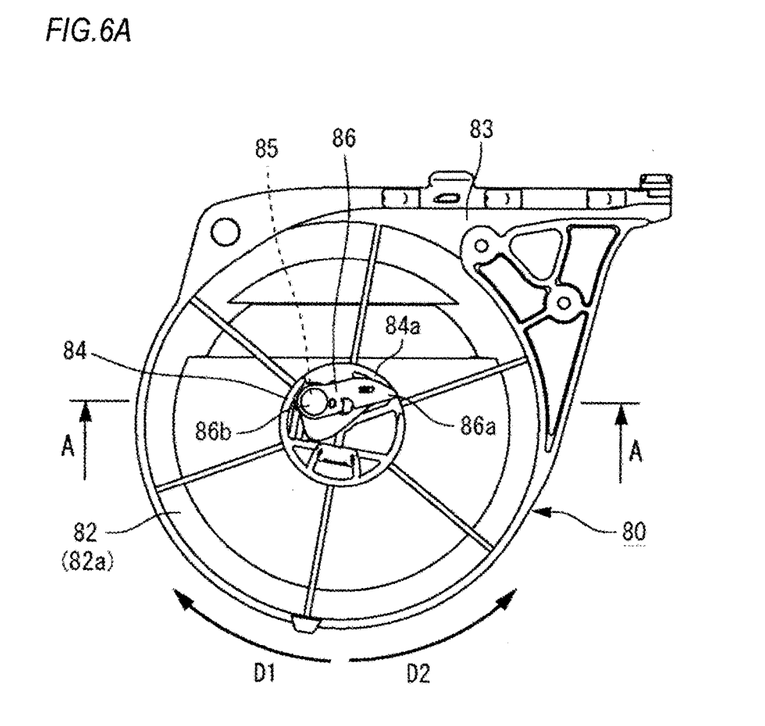
FIG. 6A is a plan view illustrating an example of a configuration of a tape magazine.
Figure 6B:
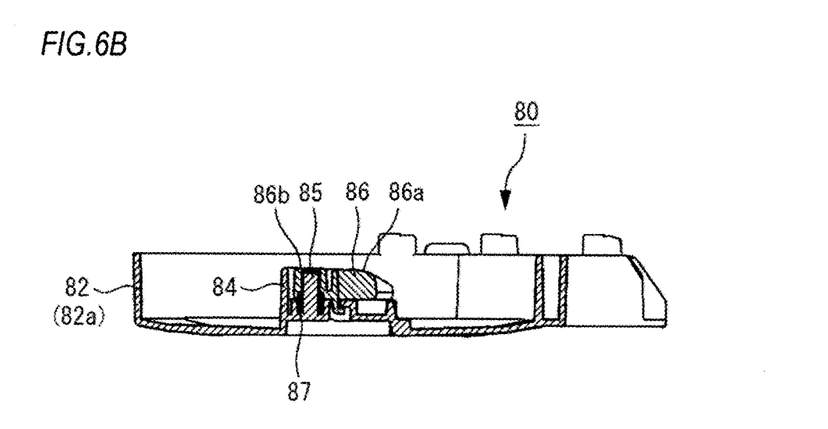
FIG. 6B is a cross-sectional view taken along line A-A in FIG. 6A.
Figure 7:
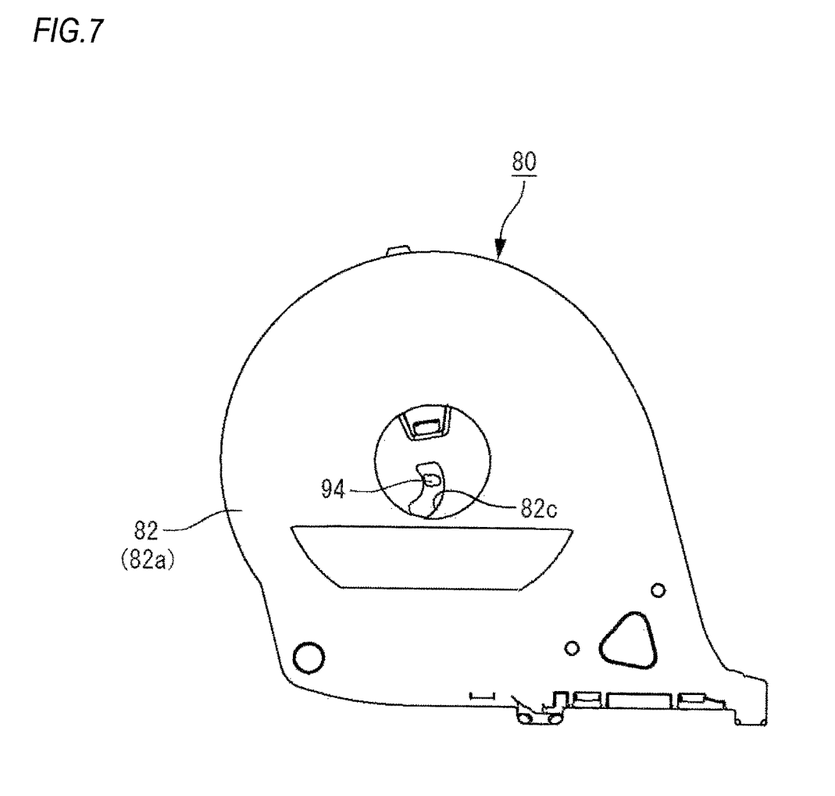
FIG. 7 is a front view illustrating an example of a configuration of a back side of the tape magazine.
Figure 8:
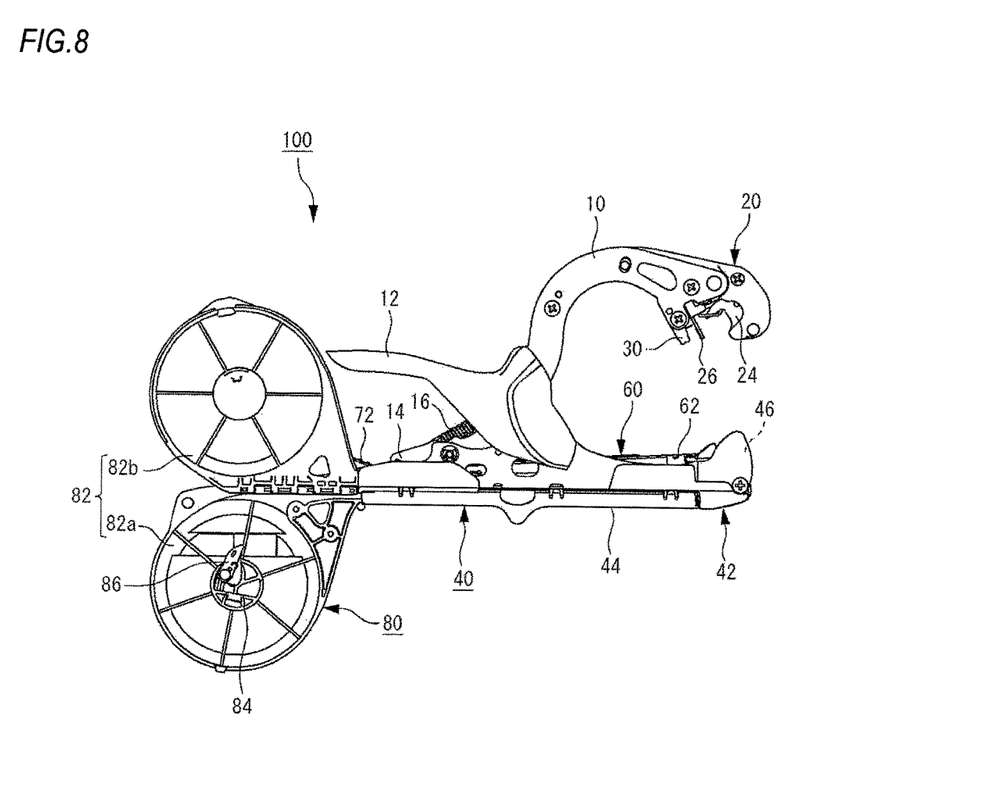
FIG. 8 is a view explaining an opening and closing operation of the tape magazine.

FIG. 6A is a plan view illustrating an example of a configuration of the tape magazine 80, and FIG. 6B is a cross-sectional view taken along the line A-A in FIG. 6A. FIG. 7 illustrates an example of the configuration of the back side of the tape magazine 80. FIG. 8 illustrates an example of the configuration in a state in which the tape magazine 80 is opened. FIGS. 9A to 9F illustrate an example of a configuration of a lever member 86.

As illustrated in FIGS. 6A, 6B, 7 and 8, the tape magazine 80 is attached to the rear end of the binding machine main body 40, and houses a tape roll in which a tape is wound around a tape reel. The tape magazine 80 includes a tape magazine main body 82, a boss 84, and the lever member 86. Further, the lever member 86 corresponds to an example of an abutting member.

As illustrated in FIG. 8 and the like, the tape magazine main body 82 has a housing 82a, a lid body 82b, and an engagement hole 82c. The housing 82a is a cylindrical body having a bottom surface portion and is selected to have a size capable of housing a tape roll having the maximum diameter to be loaded. The lid body 82b is attached to the binding machine main body 40 so as to be opened and closed with the upper end edge of the housing 82a as a fulcrum so that the opening formed in the housing 82a can be opened and closed. The engaging hole 82c will be described later.

As illustrated in FIGS. 6A and 6B and the like, the boss 84 is a member for rotatably supporting the tape roll loaded in the housing 82a. The boss 84 is a cylindrical body having a smaller diameter than the inner diameter of the tape reel of the smallest diameter of the loaded tape roll, and is provided substantially at the center of the bottom surface portion of the housing 82a. A notch portion 84a is formed in a part of the wall surface constituting the boss 84. The notch portion 84a is formed in a range corresponding to the movable area of the lever member 86 so that the lever member 86 can smoothly rotate. Further, a shaft 85 for attaching the lever member 86 is provided at a position (eccentric position) deviated from the center portion of the boss 84, that is, at a position closer to the tape reel side loaded from the center portion of the boss 84.

As illustrated in FIGS. 9A to 9F, the lever member 86 has a lever member main body 88, a shaft mounting portion 90, an inclined surface 92, and an engaging portion 94. The lever member main body 88 is an elongated member with a front end side tapered when viewed in a plan view and is selected to have a length that can abut on the inner peripheral surface of the tape reel to be loaded. The shaft mounting portion 90 is provided on the base end side of the lever member main body 88 and is rotatably attached to the shaft 85 of the boss 84. That is, the lever member main body 88 is attached to a position slightly shifted from the center portion of the boss 84 and close to the tape reel side, and is configured to be able to ensure a sufficient stroke with the most efficient design. Further, the lever member main body 88 is urged in a direction opposite to the forward rotation direction (tape feeding direction) D1 of the tape roll (hereinafter referred to as a reverse rotation direction D2) by a torsion coil spring 87 attached to the shaft 85 of the boss 84.

Figure 10A:
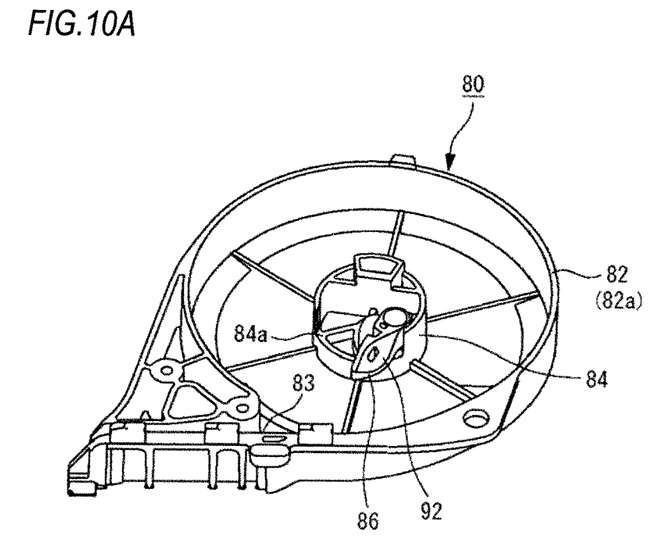
FIGS. 10A and 10B are a perspective view and a plan view illustrating a state of the lever member in a case where a tape roll is not loaded in a tape magazine main body, respectively.
Figure 10B:
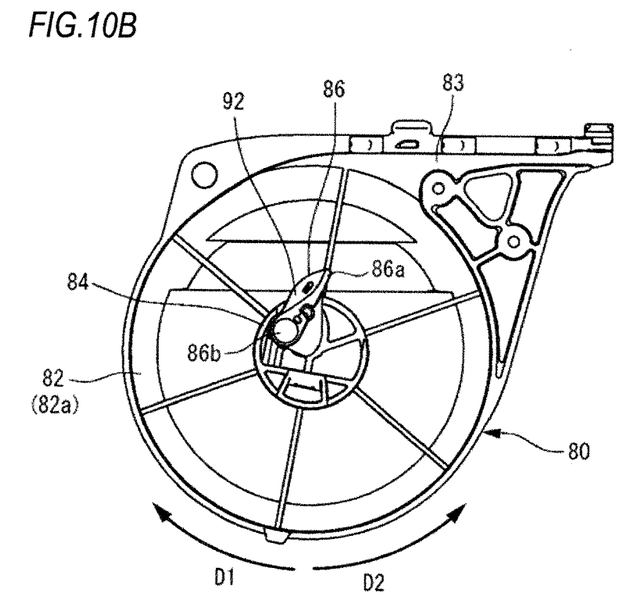

Further, as illustrated in FIGS. 6B and 10B to be described later, the lever member 86 is disposed in a trailing brake type. Specifically, in a state before the tape reel is loaded, the leading end portion 86a of the lever member 86 is disposed on the downstream side in the forward rotation direction D1 of the tape roll with respect to the base end portion 86b of the lever member 86. As a result, during the forward rotation of the tape roll, the lever member 86 is pressed in the forward rotation direction D1 by the tape reel due to friction between the leading end portion 86a of the lever member 86 and the inner peripheral surface of the tape reel, and rotates to fall down to the center of the boss 84, so that almost no rotational resistance is applied to the tape roll. On the other hand, when the tape roll rotates in the reverse direction, since the lever member 86 is disposed in the trailing brake type, the leading end portion 86a of the lever member 86 abuts against the inner peripheral surface of the tape reel so that the rotation of the lever member 86 in the reverse rotation direction D2 is restricted, and a strong braking force is applied to the tape reel.

As illustrated in FIG. 7, the engaging hole 82c formed in the tape magazine main body 82 functions as a rail when the lever member 86 is rotated, and the engaging hole 82c is formed to have a substantially arcuate shape with a length, in the bottom surface portion of the housing 82a, in accordance with the movable range of the lever member 86. Both end portions of the engaging hole 82c in the extending direction function as stoppers so that the moving range of the engaging portion 94 (the lever member 86) can be regulated.

Figure 9A:
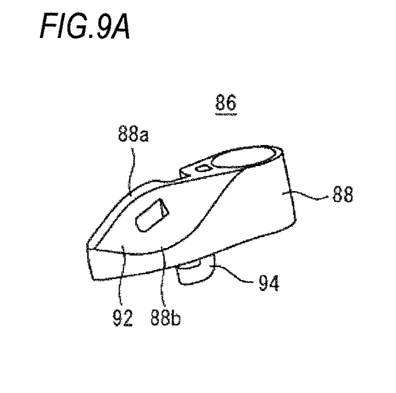
FIGS. 9A to 9F are views illustrating an example of a configuration of a lever member.
Figure 9B:
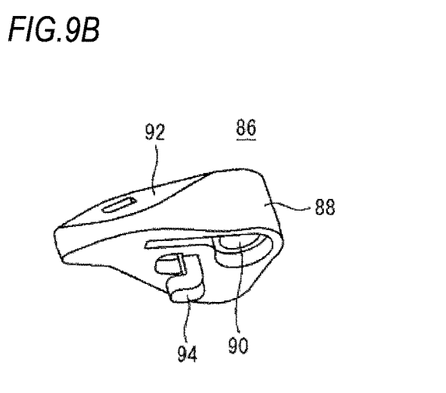
Figure 9C:
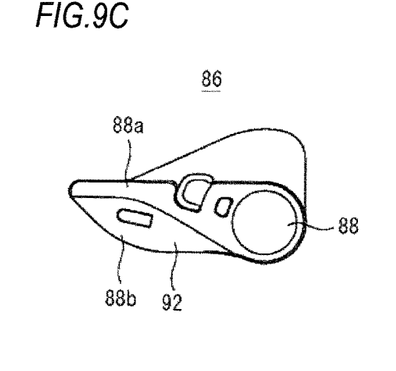
Figure 9D:
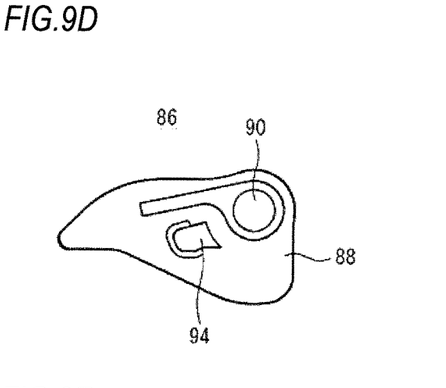
Figure 9E:
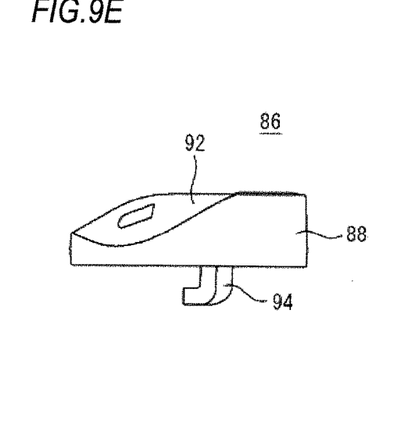
Figure 9F:
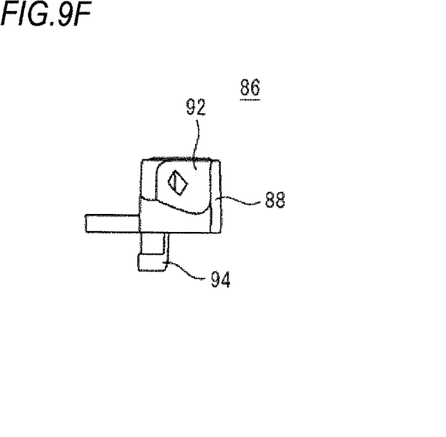

As illustrated in FIGS. 6B, 9B, and the like, the engaging portion 94 has a hook shape and is formed integrally with the back surface side of the lever member main body 88. The hook portion of the engaging portion 94 is slidably attached to the engaging hole 82c of the housing 82a. Accordingly, the lever member 86 is rotatable within the range of the length of the engaging hole 82c in the extending direction. That is, the movable range of the lever member 86 is defined in accordance with the length of the engaging hole 82c in the extending direction.

As illustrated in FIGS. 9A to 9F and the like, the inclined surface 92 is a member for smoothly guiding the tape reel to the outer peripheral position of the boss 84, and is inclined from the top surface portion 88a of the lever member main body 88 toward the peripheral edge portion 88b on the side in the reverse rotation direction D2 of the tape reel (outer side). The inclination angle of the inclined surface 92 is, for example, preferably in the range of 30 degrees to 60 degrees.

Operation Example of Tape Magazine 80

Figure 11A:
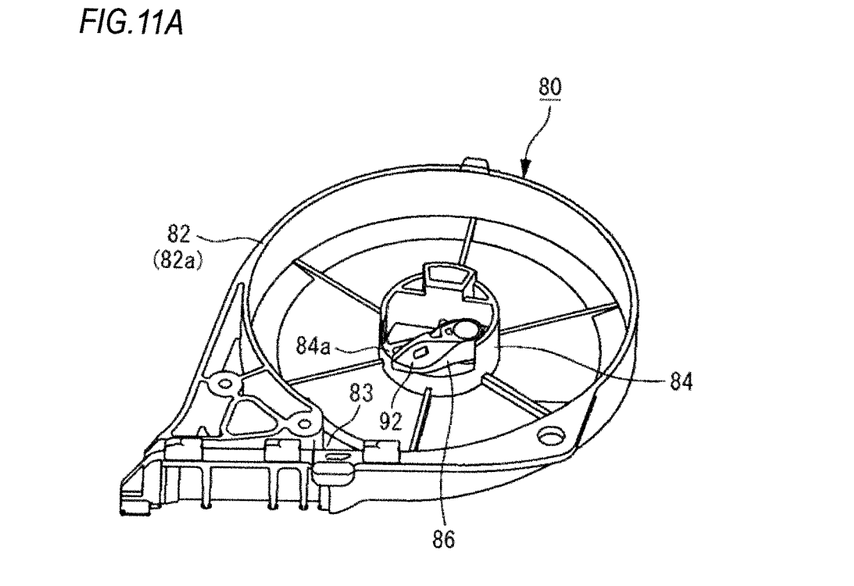
FIGS. 11A and 11B are a perspective view and a plan view illustrating a state of the lever member when the tape roll is loaded in the tape magazine main body, respectively.
Figure 11B:
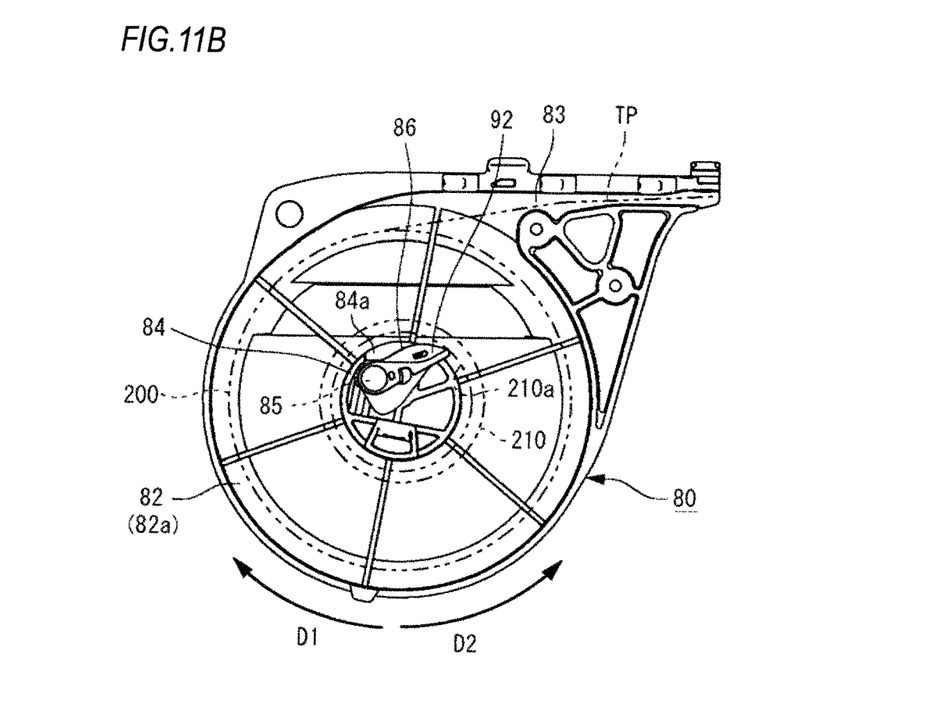

FIG. 10A is a perspective view illustrating a state of the lever member 86 in the case where the tape roll is not loaded in the tape magazine main body 82, and FIG. 10B is a plan view thereof. FIG. 11A is a perspective view illustrating a state of the lever member 86 when the tape roll is loaded in the tape magazine main body 82, and FIG. 11B is a plan view thereof. In FIG. 11B, the tape reel 210 and the tape roll 200 wound around the tape reel 210 are indicated by two-dot chain lines.

As illustrated in FIGS. 10A and 10B, when the tape roll is not mounted on the tape magazine main body 82, since the lever member 86 is urged in the reverse rotation direction D2 of the tape roll by the torsion coil spring 87, the lever member 86 rests in a state of protruding in the radial direction (outward) from the boss 84.

As illustrated in FIGS. 11A and 11B, for example, when a small-diameter tape reel 210 is mounted on the tape magazine main body 82, the inner peripheral surface 210a of the tape reel 210 abuts on the inclined surface 92 of the lever member 86, and the lever member 86 is pressed in the forward rotation direction D1 of the tape roll 200. As a result, the lever member 86 rotates in the forward rotation direction D1 of the tape roll 200 about the shaft 85 as a fulcrum, obliquely retreats to the center side of the boss 84, and the tape roll 200 is loaded in the tape magazine main body 82. At this time, since the inner peripheral surface 210a of the tape reel 210 is urged outward by the lever member 86, the tape reel 210 is held at a predetermined position in the tape magazine main body 82.

As described above, according to the present embodiment, since the lever member 86 is configured to be rotatable, an urging force can be applied by making the lever member 86 abut against any tape reel of, for example, a small diameter and a large diameter having different inner diameter dimensions. Thus, an appropriate braking force can be applied to the tape reels having different inner diameter dimensions, and it is possible to reliably prevent the tape TP from returning due to vibrations or the like of the binding machine for gardening 100.

Since the inclined surface 92 is provided on the lever member 86 to rotate the lever member 86 in the forward rotation direction D1 when the tape reel is loaded, it is possible to smoothly guide any tape reel having different inner diameter dimension to the tape magazine main body 82 to be loaded.

Further, since the lever member 86 is disposed in the trailing brake type, the braking force (tape drawing resistance) in the forward rotation direction D1 (drawing direction) of the tape TP can be lowered than the braking force in the reverse rotation direction D2 (returning direction) of the tape reel. As a result, it is possible to reliably prevent the tape TP from returning on any tape reel having different inner diameter dimension. In addition, since the resistance at the time of pulling out the tape TP is not increased, the operating load does not become heavy.

Further, since the lever member 86 is disposed in the vicinity on the upstream side in the forward rotation direction D1 of the outlet 83 of the tape in the tape magazine main body 82, the tape reel can be urged toward the tape outlet 83 side and supported, the tape TP can be fed out in the stable state, and it is also possible to reduce the contact resistance with other parts at the time of transporting the tape IP.

(1) A binding machine for gardening comprising:
a binding machine main body;
a magazine attached to the binding machine main body and loaded with a tape; and
a clincher arm rotatably attached to the binding machine main body and configured to draw the tape out of the magazine and bind an object to be bound which is wound by the tape, wherein
the magazine includes
a housing in which the tape is loaded,
a boss provided at a center of the housing and configured to support a reel around which the tape is wound, and
an abutting member rotatably attached to the boss and abuts against an inner peripheral surface of the reel.
(2) The binding machine for gardening according to (1), wherein
a front end portion of the abutting member is disposed on a downstream side in a feeding direction of the tape with respect to a base end portion of the abutting member.
(3) The binding machine for gardening according to (1) or (2), wherein
the abutting member has an inclined surface inclined from a top surface portion toward an end portion opposite to the top surface portion in the feeding direction of the tape.
(4) The binding machine for gardening according to any one of (1) to (3), wherein
the abutting member is urged in a direction opposite to the feeding direction of the tape.
(5) The binding machine for gardening according to any one of (1) to (4), wherein
the abutting member is disposed in a vicinity on an upstream side in the feeding rotation direction of an outlet of the tape.

The invention claimed is:
1. A binding machine for gardening comprising:
a binding machine main body;
a magazine that is attached to the binding machine main body and loaded with a tape; and
a clincher arm that is rotatably attached to the binding machine main body and is configured to draw the tape out of the magazine and bind an object to be bound which is wound by the tape, the clincher arm including a lock plate, a tape catch, and a tape plate, the lock plate being rotatable and urged by a coil spring, the tape catch being rotatable and urged toward the tape plate by a torsion spring, and the tape plate facing the tape catch, wherein
the magazine includes
a housing in which the tape is loaded,
a boss that is provided at a center of the housing and that is configured to support a reel around which the tape is wound, the boss being a cylindrical body having a smaller diameter than an inner diameter of the reel, and including a notch portion formed in a wall portion,
a shaft internal to the boss, and
an abutting member defining a lever that is pivotably attached to the boss by the shaft at a proximate end, defining a leading edge portion at a distal end that abuts against an inner peripheral surface of the reel, and defining an inclined surface inclined from a top surface toward a bottom surface opposite the top surface at an inclination angle in a range of 30-60 degrees, and
wherein
the abutting member includes a hook-shaped engaging portion projecting from the bottom surface,
the housing includes an engagement hole, and the engaging portion sliding in the engagement hole defines the movable range of the abutting member.

2. The binding machine for gardening according to claim 1, wherein
the leading edge portion of the abutting member is disposed on a downstream side in a feeding direction of the tape with respect to the proximate end of the abutting member.

3. The binding machine for gardening according to claim 1, wherein
the abutting member is urged in a direction opposite to the feeding direction of the tape.

4. The binding machine for gardening according to claim 2, wherein
the abutting member is urged in a direction opposite to the feeding direction of the tape.

* * * * *